(12) United States Patent
Kakou et al.

(10) Patent No.: US 7,479,979 B2
(45) Date of Patent: *Jan. 20, 2009

(54) OMNIDIRECTIONAL MONITORING CONTROL SYSTEM, OMNIDIRECTIONAL MONITORING CONTROL METHOD, OMNIDIRECTIONAL MONITORING CONTROL PROGRAM, AND COMPUTER READABLE RECORDING MEDIUM

(75) Inventors: Noritoshi Kakou, Nara (JP); Yoshio Fukuhara, Saitama (JP); Masahiro Misawa, Hyogo (JP)

(73) Assignee: Sharp Kabushiki Kaisha, Osaka (JP)

( * ) Notice: Subject to any disclaimer, the term of this patent is extended or adjusted under 35 U.S.C. 154(b) by 1058 days.

This patent is subject to a terminal disclaimer.

(21) Appl. No.: 10/376,927

(22) Filed: Feb. 27, 2003

(65) Prior Publication Data

US 2003/0160863 A1 Aug. 28, 2003

(30) Foreign Application Priority Data

Feb. 28, 2002 (JP) ............................... 2002-054968

(51) Int. Cl.
*H04N 9/47* (2006.01)
(52) U.S. Cl. ..................................................... 348/143
(58) Field of Classification Search ............. 348/36–37, 348/39, 46, 47, 143, 159, 38, 42, 211.11, 348/256, 170, 152, 148; 382/293, 113, 284; *G03B 17/00; H04N 9/47*
See application file for complete search history.

(56) References Cited

U.S. PATENT DOCUMENTS

| 5,278,643 | A | | 1/1994 | Takemoto et al. |
| 5,359,363 | A | | 10/1994 | Kuban et al. |
| 5,477,459 | A | * | 12/1995 | Clegg et al. ................... 701/300 |
| 5,920,337 | A | * | 7/1999 | Glassman et al. .............. 348/36 |
| 6,215,519 | B1 | * | 4/2001 | Nayar et al. .................. 348/159 |
| 6,408,085 | B1 | * | 6/2002 | Yuen ........................... 382/113 |
| 6,762,789 | B1 | * | 7/2004 | Sogabe et al. .................. 348/36 |
| 6,771,304 | B1 | * | 8/2004 | Mancuso et al. ............... 348/39 |
| 6,947,611 | B2 | * | 9/2005 | Kawakami et al. ........... 382/293 |
| 7,006,950 | B1 | * | 2/2006 | Greiffenhagen et al. ........ 703/2 |

(Continued)

FOREIGN PATENT DOCUMENTS

EP 0 714 081 A1 5/1996

(Continued)

*Primary Examiner*—Tung Vo
(74) *Attorney, Agent, or Firm*—David G. Conlin; Steven M. Jensen; Edwards Angell Palmer & Dodge LLP

(57) ABSTRACT

An omnidirectional monitoring control system includes an omnidirectional camera for taking an omnidirectional image over a viewing angle of a maximum of 360 degrees; at least one zoom camera for performing positional control and magnification ratio control; a control section for rotating the omnidirectional image about a central axis of the omnidirectional image at a prescribed angle such that an apparent reference position of the omnidirectional camera is matched with an apparent reference position for driving the at least one zoom camera, and driving the at least one zoom camera to allow a prescribed monitoring position of omnidirectional image data obtained by the rotation to be photographed by the at least one zoom camera; and a display section for displaying the omnidirectional image taken by the omnidirectional camera and a zoom image taken by the at least one zoom camera.

19 Claims, 10 Drawing Sheets

U.S. PATENT DOCUMENTS

| | | | |
|---|---|---|---|
| 7,058,239 B2 * | 6/2006 | Singh et al. | 382/284 |
| 7,071,971 B2 * | 7/2006 | Elberbaum | 348/211.11 |
| 2003/0071891 A1 * | 4/2003 | Geng | 348/39 |
| 2003/0142203 A1 * | 7/2003 | Kawakami et al. | 348/36 |
| 2003/0160868 A1 * | 8/2003 | Kakou et al. | 348/143 |
| 2004/0104996 A1 * | 6/2004 | Hayashi et al. | 348/36 |

FOREIGN PATENT DOCUMENTS

| | | |
|---|---|---|
| JP | 03-084700 | 4/1991 |
| JP | 11-259775 | 9/1999 |
| WO | WO 97/50252 | 12/1997 |
| WO | WO 99/45511 | 9/1999 |

* cited by examiner

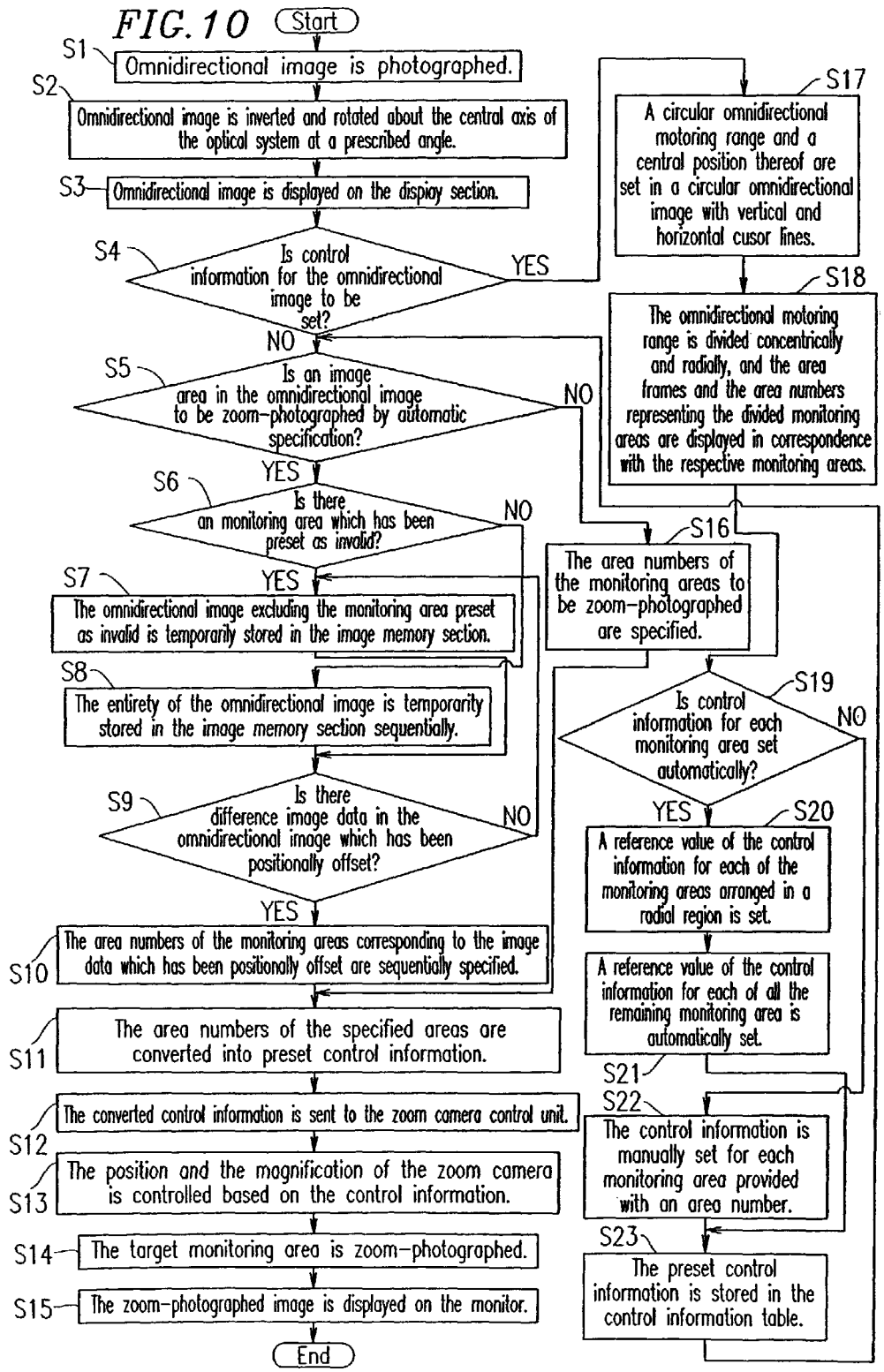

OMNIDIRECTIONAL MONITORING CONTROL SYSTEM, OMNIDIRECTIONAL MONITORING CONTROL METHOD, OMNIDIRECTIONAL MONITORING CONTROL PROGRAM, AND COMPUTER READABLE RECORDING MEDIUM

BACKGROUND OF THE INVENTION

1. Field of the Invention

The present invention relates to an omnidirectional monitoring system for taking an omnidirectional image using an omnidirectional camera capable of capturing information of a viewing angle of a maximum of 360 degrees, and zoom-photographing the omnidirectional image centered on a monitoring area automatically or manually specified; an omnidirectional monitoring control method using the same; an omnidirectional monitoring control program usable for the same, and a computer readable recording medium having the program stored therein.

2. Description of the Related Art

Monitoring cameras conventionally and generally known as used in security devices installed in, for example, financial institutions and supermarkets include fixed-type and pivotable cameras. Usually, a manager checks a video taken by such a monitoring camera using a monitoring device or the like in the manager's office, so that the manager can recognize any abnormality caused by, for example, a trespasser or a fire and take emergency measures.

A monitoring instrument for allowing the manager to monitor a video taken by the monitoring camera on a screen of a monitoring device is inevitably large-sized and can be quite expensive. Even such a large instrument is still insufficient for accurately monitoring a target of crime prevention at a remote location.

Generally known security monitoring devices include devices which issue an alarm using (i) sensors for sensing a trespasser who intercepts, for example, laser light or infrared rays; or (ii) sensors for sensing fires and gas leaks. When such a security device using such a sensor gives an alarm, the manager can recognize that an abnormality has occurred, but cannot obtain accurate information by visually checking the degree or details of the abnormality.

As the number of crimes increases year by year, a security monitoring system has been demanded for allowing the manager at a remote location to accurately identify the occurrence of an abnormality while monitoring the target of crime prevention without requiring the manager to pay special attention.

Proposals for solving the above-described problems are described in, for example, Japanese Laid-Open Publication No. 3-84700 directed to "Remote Monitoring Device", Japanese Laid-Open Publication No. 4-176484 directed to "Monitoring System in Play Hall", and Japanese Laid-Open Publication No. 11-259775 directed to "Monitoring System".

The "Remote Monitoring Device" disclosed by Japanese Laid-Open Publication No. 3-84700 operates as follows. A plurality of sensors are dispersed in blocks of a monitoring area such that each sensor can detect an abnormality in the respective block. When an abnormality is detected, a TV camera is automatically directed to the site of the abnormality, and transfers the abnormality detection signal and the video signal captured by the TV camera to a terminal in the monitoring office. The terminal automatically displays the image of the site of the abnormality and related information. Thus, the situation at the site of the abnormality is recognized easily and with certainty.

The "Monitoring System in Play Hall" disclosed by Japanese Laid-Open Publication No. 4-176484 operates as follows. A monitoring video camera is set to a monitoring state for monitoring a game machine, which has been determined to be in an abnormality based on the result of analysis of information obtained by abnormality detection means. The video information on that game machine is displayed on the screen of the video camera. Thus, the monitoring efficiency of each game machine can be improved at low equipment cost.

The "Monitoring System" disclosed by Japanese Laid-Open Publication No. 11-259775 operates as follows. An image of a monitoring area is captured by a wide-range camera, and the captured image is compared with an image of a normal state so as to find a difference. Thus, an abnormality is detected. When an abnormality occurs, an image of the abnormality is captured by the wide-range camera, and also an image at an important location is captured by a zoom camera. The image obtained by the wide-range camera and the image obtained by the zoom camera are transferred to a terminal computer. Thus, a manager at a remote location can recognize that the situation of the abnormality relatively in detail, and accurately specify the degree of the abnormality and the like.

The above-described technologies have the following problems.

In the case of the "Remote Monitoring Device" disclosed by Japanese Laid-Open Publication No. 3-84700, the sensors are dispersed. This means that the sensors can detect abnormalities only at sites where the sensors are located. In addition, certain types of sensor can only detect an abnormality of the respective type. There are other problems in that the reliability of the sensors dispersed may be lowered, and it is difficult to control the position of the TV camera with respect to the sensors.

In the case of the "Monitoring System in Play Hall" disclosed by Japanese Laid-Open Publication No. 4-176484, abnormality detection means including various sensors needs to be located in the vicinity of each game machine. Therefore, abnormalities only at site where the sensors are located can be detected. There are other problems in that the sensors may malfunction because of the environment in which the sensors are located, and it is troublesome to control the position of the TV camera with respect to the various sensors.

In the case of the "Monitoring System" disclosed by Japanese Laid-Open Publication No. 11-259775, the wide-range camera acts as one sensor for comparing an image of a target of monitoring and an image of a normal state and detecting an abnormality based on the difference. The zoom camera is set to be directed to several preset important locations. The zoom camera is not structured so as to track the sites of abnormality photographed by the wide-range camera and to have the position and the magnification ratio thereof controlled. Therefore, when there are many important locations, the important location at which an abnormality has occurred needs to be visually checked. This requires images of a plurality of important locations to be taken simultaneously.

SUMMARY OF THE INVENTION

According to one aspect of the invention, an omnidirectional monitoring control system includes an omnidirectional camera for taking an omnidirectional image over a viewing angle of a maximum of 360 degrees; at least one zoom camera for performing positional control and magnification ratio control; a control section for rotating the omnidirectional image about a central axis of the omnidirectional image at a prescribed angle such that an apparent reference position of the omnidirectional camera is matched with an apparent reference position for driving the at least one zoom camera, and driving the at least one zoom camera to allow a prescribed monitoring position of omnidirectional image data obtained by the rotation to be photographed by the at least one zoom camera; and a display section for displaying the omnidirectional image taken by the omnidirectional camera and a zoom image taken by the at least one zoom camera.

In one embodiment of the invention, the positional control is performed for controlling a photographic position by pan driving and tilt driving, and the magnification ratio control is performed by zoom driving.

In one embodiment of the invention, the prescribed monitoring position of the omnidirectional image data is a position where a moving subject has been detected or a manually specified position.

In one embodiment of the invention, the control section includes an image processing section for processing the omnidirectional image; a monitoring area setting section for setting a prescribed monitoring range of the omnidirectional image as an omnidirectional monitoring range, and dividing the omnidirectional monitoring range into a plurality of monitoring areas; a detecting area for detecting a movement of a subject in the omnidirectional monitoring range; a specifying area for specifying one of the plurality of monitoring areas based on a detection result obtained by the detecting section or manually; a converting section for converting information on the monitoring area specified by the specifying section into control information for controlling the zoom camera to be at a prescribed position and to have a prescribed magnification ratio for photographing the monitoring area specified by the specifying section; and a zoom camera control section for controlling the zoom camera to be at the prescribed position and to have the prescribed magnification ratio for zoom-photographing the monitoring area specified by the specifying section, based on the control information converted by the converting section.

In one embodiment of the invention, the omnidirectional camera includes an optical system for projecting the omnidirectional image using a mirror of a parabolic or hyperbolic convex body of revolution, or a fish-eye lens.

In one embodiment of the invention, the omnidirectional camera includes an optical system for projecting the omnidirectional image using a mirror of a parabolic or hyperbolic convex body of revolution, or a fish-eye lens.

In one embodiment of the invention, the image processing section inverts the omnidirectional image taken by the omnidirectional camera with respect to the optical image obtained by the mirror of convex body of revolution and rotating the omnidirectional image about a central axis of the mirror of convex body of revolution by a prescribed angle in a prescribed direction, and displays the obtained image on a display screen of the display section.

In one embodiment of the invention, when the omnidirectional image is circular, the monitoring area setting section sets a circular omnidirectional monitoring range such that a reference position thereof is fine-tunable by a cursor (for example, a vertical cursor line and a horizontal cursor line), divides the omnidirectional monitoring range concentrically and radially into the plurality of monitoring areas, and identifiably displays the plurality of monitoring areas together with area frames or area numbers respectively defining the plurality of image areas.

In one embodiment of the invention, the omnidirectional monitoring control system further includes a control information setting section for sequentially setting the control information for controlling the zoom camera to be at the prescribed position by pan driving and tilt driving and to have the prescribed magnification ratio by zoom driving for each of the plurality of monitoring areas displayed on the display screen of the display section using a specific operation input section; and a control information table for storing the sequentially set control information in correspondence with each of the plurality of monitoring areas. The converting section obtains the control information for the monitoring area specified by the specifying section from the control information table and/or from calculation using a prescribed calculation procedure.

In one embodiment of the invention, the control information setting section sets the control information such that the zoom camera is at different pan positions for the monitoring areas arranged in different concentric regions with the same tilt position and the same magnification ratio, and such that the zoom camera has different magnification ratios for the monitoring areas arranged in different radial regions with the same pan position and the same tilt position.

In one embodiment of the invention, the control information setting section sets a reference value of the control information for the monitoring areas arranged in one radial region, and thus automatically sets a value of the control information for all the remaining monitoring areas.

In one embodiment of the invention, when the zoom camera and the omnidirectional camera are separated by a prescribed distance or greater, the control information setting section corrects a value for each of the pan position, the tilt position and the magnification ratio of the control information for each monitoring area, such that an apparent reference position of the omnidirectional camera is matched with an apparent reference position for driving the zoom camera.

In one embodiment of the invention, the omnidirectional monitoring control system further includes an image memory section for temporarily storing the omnidirectional image taken by the omnidirectional camera frame by frame sequentially, wherein the detecting section creates a difference image by performing pattern matching of successive frames of the omnidirectional image stored in the image memory section, and identifiably displays the difference image as the movement of the subject on a display screen of the display section.

In one embodiment of the invention, the detecting section displays, on the omnidirectional image, a vertical cursor and a horizontal cursor which cross each other at a position representing a difference image having a prescribed number of pixels, and outputs the area number of the monitoring area having an intersection of the vertical cursor and the horizontal cursor to the specifying section at a prescribed cycle.

In one embodiment of the invention, when a binary difference image is created using a prescribed number of pixels and a prescribed density value as threshold values, the detecting section changes the threshold values in accordance with the position of the monitoring area with respect to the omnidirectional monitoring range.

In one embodiment of the invention, when a binary difference image is created using a prescribed number of pixels and a prescribed density value as threshold values, the detecting section detects, from an average density value of an image of one monitoring area, a change in brightness around the one monitoring area and change the threshold values based on the change in brightness.

In one embodiment of the invention, the omnidirectional monitoring control system further includes an invalid area setting section for presetting, as invalid, an arbitrary area of the omnidirectional monitoring range by an input operation performed through an operation input section, and identifiably displays the monitoring area which has been preset as invalid on the display screen of the display section.

According to another aspect of the invention, an omnidirectional monitoring control method includes the steps of processing an omnidirectional image taken by an omnidirectional camera capable of taking an omnidirectional image over a viewing angle of a maximum of 360 degrees; displaying the processed omnidirectional image; setting a prescribed range of the omnidirectional image as an omnidirectional monitoring range, and dividing the omnidirectional monitoring range into a plurality of monitoring areas; detecting a movement of a subject in the omnidirectional monitoring range; specifying one of the monitoring areas based on a detection result obtained by the detecting section or manually; converting information on the monitoring area specified by the specifying section into control information for controlling the zoom camera to be at a prescribed position and to have a prescribed magnification ratio for zoom-photographing the monitoring area specified by the specifying section; and controlling the zoom camera to be at the prescribed position and to have the prescribed magnification ratio for zoom-photographing the monitoring area specified by the specifying section, based on the control information converted by the converting section.

According to still another aspect of the invention, a zoom camera control program for causing a computer to execute the processing an omnidirectional image taken by an omnidirectional camera capable of taking an omnidirectional image over a viewing angle of a maximum of 360 degrees; displaying the processed omnidirectional image; setting a prescribed range of the omnidirectional image as an omnidirectional monitoring range, and dividing the omnidirectional monitoring range into a plurality of monitoring areas; detecting a movement of a subject in the omnidirectional monitoring range; specifying one of the monitoring areas based on a detection result obtained by the detecting section or manually; converting information on the monitoring area specified by the specifying section into control information for controlling the zoom camera to be at a prescribed position and to have a prescribed magnification ratio for zoom-photographing the monitoring area specified by the specifying section; and controlling the zoom camera to be at the prescribed position and to have the prescribed magnification ratio for zoom-photographing the monitoring area specified by the specifying section, based on the control information converted by the converting section.

According to still another aspect of the invention, a computer readable recording medium having the above-described control program stored therein is provided.

As described above, according to the present invention, a plurality of monitoring areas are set in a wide-range omnidirectional image taken by an omnidirectional camera, and one of the monitoring areas is automatically or manually specified. Thus, the omnidirectional image can be zoom-photographed, centered on the monitoring area with high precision. The omnidirectional image taken by the omnidirectional camera is inverted with respect to an optical image projected by the optical system and rotated about the central axis of the optical system at a prescribed angle in a prescribed direction. The zoom camera is driven about a prescribed monitoring position of the resultant omnidirectional image data. Thus, the apparent central position of the omnidirectional camera can be matched with the apparent central position for driving the zoom camera. In this manner, the omnidirectional image taken by the omnidirectional camera and the image zoom-photographed by the zoom camera can be checked at the same viewing angle. Therefore, the site of the abnormality can be tracked. Even when there are a plurality of important sites, the important site where abnormality has actually occurred can be visually checked.

An omnidirectional horizontal optical image over a viewing angle of a maximum of 360 degrees is projected to an imaging section through a mirror of a convex body of revolution or a-fish-eye lens. Since a wide monitoring range is photographed by one omnidirectional camera, it is not necessary to install a plurality of monitoring cameras.

An omnidirectional image taken by an omnidirectional camera is inverted with respect to the mirror of a convex body of revolution and rotated about the central axis of the mirror of a convex body of revolution at a prescribed angle in a prescribed direction. The obtained image is displayed on a display screen of the display section. Thus, the omnidirectional image taken by the omnidirectional camera can be checked with the same viewing angle as that of the image taken by the zoom camera. Also, the relative positions of the optical image projected on the mirror of a convex body of revolution and the omnidirectional image taken by the imaging section of the zoom camera can be adjusted.

A circular omnidirectional monitoring range is set with respect to a circular omnidirectional image with high precision, and the omnidirectional monitoring range is divided into a plurality of monitoring areas. The area frames and the area numbers respectively provided for the plurality of monitoring areas can be identifiably color-displayed in association with the plurality of monitoring areas.

The control information for the zoom camera is set for each of the monitoring areas displayed on the display screen of the display section by a simple key or mouse operation. The control information can be correctly corresponded to the specified monitoring area.

The control information is set such that the zoom camera is at different pan positions for the monitoring areas arranged in different concentric regions with the same tilt position and the same magnification ratio, and such that the zoom camera has different magnification ratios for the monitoring areas arranged in different radial regions with the same pan position and the same tilt position. In this case, the operation of setting the control information for each monitoring area is simplified, and the optimum zoom photographing of each monitoring area can be performed.

A reference value of the control information is set for the monitoring areas arranged in one radial region, and thus a value of the control information is automatically set for all the remaining monitoring areas. In this case, the control information for the zoom camera for photographing each monitoring area can be easily set.

When the zoom camera and the omnidirectional camera are separated by a prescribed distance or greater, the control information setting section corrects a value for each of the pan position, the tilt position and the magnification ratio of the control information for each monitoring area, such that an apparent reference position of the omnidirectional camera is matched with an apparent reference position for driving the zoom camera. In this case, even when the zoom camera is distant from the omnidirectional camera, the zoom camera can zoom-photograph the monitoring area at the same viewing angle as that of the omnidirectional camera.

The omnidirectional image taken by the omnidirectional camera is stored frame by frame sequentially, and a difference image is created by performing pattern matching of successive frames of the omnidirectional image stored in the image memory section and identifiably displayed as the movement of the subject on a display screen of the display section. In this case, the movement of the subject included in the omnidirectional image taken by the omnidirectional camera can be easily detected from the difference image displayed on the display section.

A vertical cursor line and a horizontal cursor line which cross each other at a position representing a difference image having a prescribed number of pixels are displayed, and the area number of the monitoring area having an intersection of the vertical cursor line and the horizontal cursor line is output to the specifying section at a prescribed cycle. In this case, the position of the difference image representing the movement of the subject can be easily confirmed, and the area number of the monitoring area including the difference image can be automatically specified at a prescribed cycle.

When a binary difference image is created using a prescribed number of pixels and a prescribed density value as threshold values, the threshold values are changed in accordance with the position of the monitoring area with respect to the omnidirectional monitoring range. In this case, the precision of creating the difference image can be prevented from lowering depending on the position of the monitoring area, and the precision of detecting the movement of the subject can be improved.

When a binary difference image is created using a prescribed number of pixels and a prescribed density value as threshold values, a change in brightness around the one monitoring area can be detected from an average density value of an image of one monitoring area, the threshold values can be changed based on the change in brightness. In this case, the precision of creating the difference image can be prevented from lowering due to the change in the brightness around the monitoring area, and the precision of detecting the movement of the subject can be improved.

An arbitrary area of the omnidirectional monitoring range can be preset as invalid by an input operation performed through an operation input section, and the monitoring area which has been preset as invalid is displayed on the display screen of the display section. In this case, the monitoring area which is unstable due to environmental influence is preset as invalid. Thus, the precision of detecting the movement of the subject is prevented from lowering, and malfunction of the zoom camera is avoided.

Thus, the invention described herein makes possible the advantages of providing an omnidirectional monitoring system for zoom-photographing a specified monitoring area with high precision in an omnidirectional image taken by an omnidirectional camera so as to include images of a plurality of important sites; and an omnidirectional monitoring control method using the same; an omnidirectional monitoring control program usable for the same; and a computer readable recording medium having the program stored therein.

These and other advantages of the present invention will become apparent to those skilled in the art upon reading and understanding the following detailed description with reference to the accompanying figures.

BRIEF DESCRIPTION OF THE DRAWINGS

FIG. 10 is a flowchart illustrating a basic operation procedure of the omnidirectional monitoring control system shown in FIG. 1.

DESCRIPTION OF THE PREFERRED EMBODIMENTS

Hereinafter, the present invention will be described by way of illustrative, but non-limiting examples with reference to the accompanying drawings.

Figure 1:
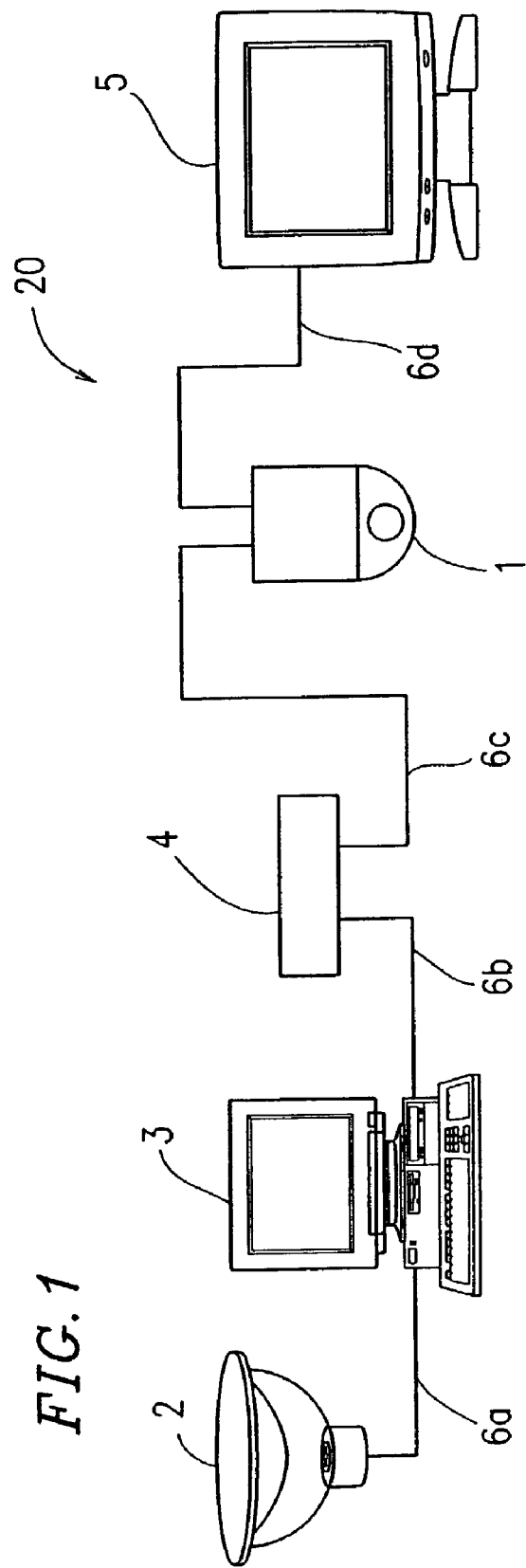
FIG. 1 is a schematic view illustrating a basic structure of an omnidirectional monitoring control system according to an example of the present invention.

FIG. 1 is a schematic view illustrating a basic structure of an omnidirectional monitoring control system 20 according to an example of the present invention.

In FIG. 1, the omnidirectional monitoring control system 20 includes a zoom camera 1, an omnidirectional camera 2, a remote controller 3, a zoom camera control unit 4 acting as a zoom camera control section, a monitor 5, and communication lines 6a through 6d for connecting these elements so that these elements can communicate with each other.

The zoom camera 1 includes, for example, a zoom lens, an imaging section (photographing section) including CCDs, and a driving section for driving and controlling the zoom lens to pan (to move to a prescribed position in a horizontal direction), to tilt (to move to a prescribed position in a vertical direction) and to zoom (to have a prescribed magnification ratio). The zoom camera 1 also includes a communication section for transferring a control signal or an image signal via a wireless or wired line. Based on control information sent from the zoom camera control unit 4, the zoom camera 1 is driven and controlled to be a prescribed position (by pan and tilt) and to have a prescribed magnification ratio (by zoom). For example:

zoom ratio: optical zoom: X23;
   electronic zoom: X10
zoom speed: MAX1.6 seconds (at the preset time)
number of presets: 255 (255 positions and magnification ratios)

The omnidirectional camera 2 includes, for example, an optical system (e.g., a mirror of a convex body of revolution, or a fish-eye lens) for projecting an optical image of an area over a viewing angle of a maximum of 360 degrees, and an imaging section (photographing section), including CCDs, for photographing the optical image as a circular omnidirectional image. For example, a detection area (monitoring area) can have a radius of 15 meters from the omnidirectional camera 2.

The remote controller 3 includes, for example, a personal computer which can communicate with other devices via a wireless or wired line. As described in detail below, the remote controller 3 includes a control section. The control section performs the following control in order to allow the omnidirectional image taken by the omnidirectional camera 2 to be checked at the same viewing angle with the image zoom-photographed by the zoom camera 1. This is realized by matching the apparent reference position of the omnidirectional camera 2 (or the apparent central position of the area of interest) with the apparent reference position (or the apparent central position) for driving the zoom camera 1 as follows. The omnidirectional image taken by the omnidirectional camera 2 is inverted with respect to the optical image projected by the optical system 2a and rotated about the central axis of the optical system 2a (about the central axis of the omnidirectional image) at a prescribed angle in a prescribed direction. The inversion is required since the optical image projected by the optical system 2a has a left half and a right half opposite to the way they should be. The "rotated at a prescribed angle" refers to that, for example, where the position of the area numbered "1" (described below) is the reference position, the positional control of the zoom camera 1 is also performed with the position of the area numbered "1" as the reference position.

The zoom camera control unit 4 includes a computer including, for example, a CPU (central processing unit), ROM, RAM, and I/O port; and a zoom camera driving circuit. Based on the control information supplied from the remote controller 3, the zoom camera control unit 4 controls the position and the magnification ratio of the zoom camera 1. The zoom camera control unit 4 has a function of communicating with other devices via a wireless or wired line.

The monitor 5 includes, for example, a liquid crystal display (LCD), a plasma display (PD), or an electroluminescence display (ELD). The monitor 5 displays an image which is zoom-photographed by the zoom camera 1.

Among the communication lines 6a through 6d, the communication line 6a communicates the omnidirectional camera 2 and the remote controller 3 to each other by an NTSC system. The communication line 6a transfers an omnidirectional image taken by the omnidirectional camera 2 to the remote controller 3. The communication line 6b connects the remote controller 3 and the zoom camera control unit 4 to each other by an RS-232C system. The communication line 6b transfers, to the zoom camera control unit 4, control information for controlling the zoom camera 1 to be at a prescribed position (to assume a prescribed photographing direction) and to have a prescribed magnification ratio. The communication line 6c connects the zoom camera control unit 4 and the zoom camera 1 to each other by an RS-485 system, so that the zoom camera control unit 4 controls the position and the magnification ratio of the zoom camera 1 for zooming a monitoring area specified as described in detail below. The communication line 6d connects the zoom camera 1 and the monitor 5 by an NTSC system. The communication line 6d transfers an image zoom-photographed by the zoom camera 1 to the monitor 5.

In this example, the zoom camera control unit 4 is provided as a separate unit. Alternatively, the zoom camera control unit 4 may be incorporated into the remote controller 3 or the zoom camera 1. The zoom camera 1 and the omnidirectional camera 2 can each have a function of communicating with other devices via a wireless or wired line.

Figure 2:
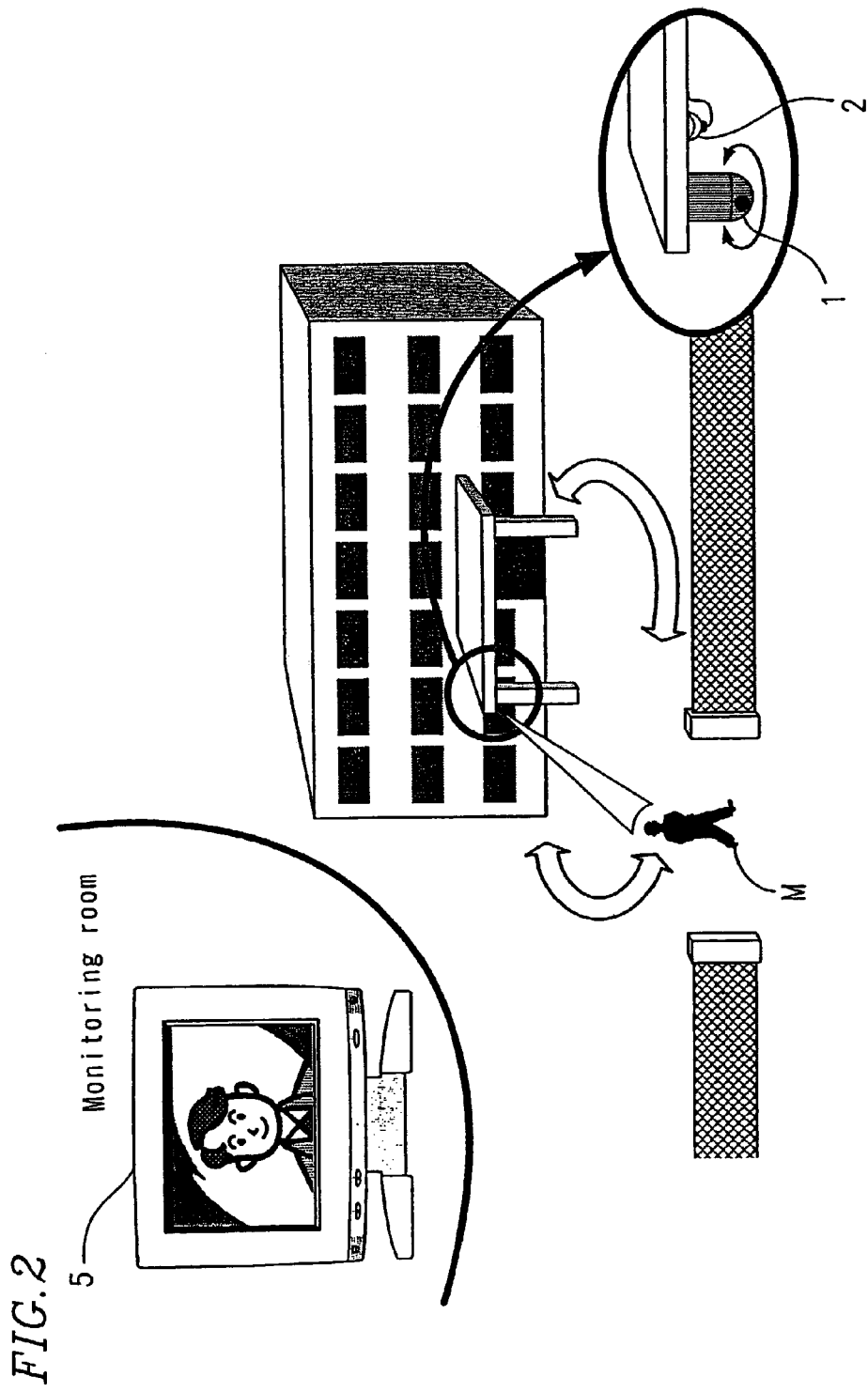
FIG. 2 shows an example of a monitoring system using the omnidirectional monitoring control system shown in FIG. 1.

FIG. 2 shows an exemplary monitoring system including the omnidirectional monitoring control system 20 shown in FIG. 1. Identical elements previously discussed with respect to FIG. 1 bear identical reference numerals and the detailed descriptions thereof will be omitted.

In FIG. 2, the omnidirectional monitoring control system 20 continuously monitors sites for monitoring such as, for example, a schoolyard/school gate/gym/elevator entrance, a parking lot, an office, a store, an apartment building, or a place of amusement, with the omnidirectional camera 2 over a wide range (maximum viewing angle: 360 degrees) with no dead angle. When detecting a trespasser M, the zoom camera 1 is controlled to be directed to the trespasser M and zoom-photographs the trespasser M at a prescribed magnification ratio. The image is displayed by the monitor 5, which is located separately from the remote controller 3 but acts as a display section of the remote controller 3. An enlarged image of the trespasser M may be displayed both on a display screen of the remote controller 3 and a display screen of the monitor 5.

In this example, the zoom camera 1 and the omnidirectional camera 2 are installed over the entrance to a school as shown in FIG. 2. The trespasser M entering through the school gate is detected by the omnidirectional camera 2 and is zoom-photographed by the zoom camera 1. An enlarged image of the trespasser M is displayed on the monitor 5 installed in a monitoring room.

Although not shown in FIG. 2, the remote controller 3 for remote-controlling the omnidirectional camera 2, the zoom camera control unit 4 for controlling the position and the magnification ratio of the zoom camera 1, and the communication lines 6a through 6d for communicating the remote controller 3, the zoom camera 1, the omnidirectional camera 2 and the like are also installed in the monitoring room.

Figure 3:
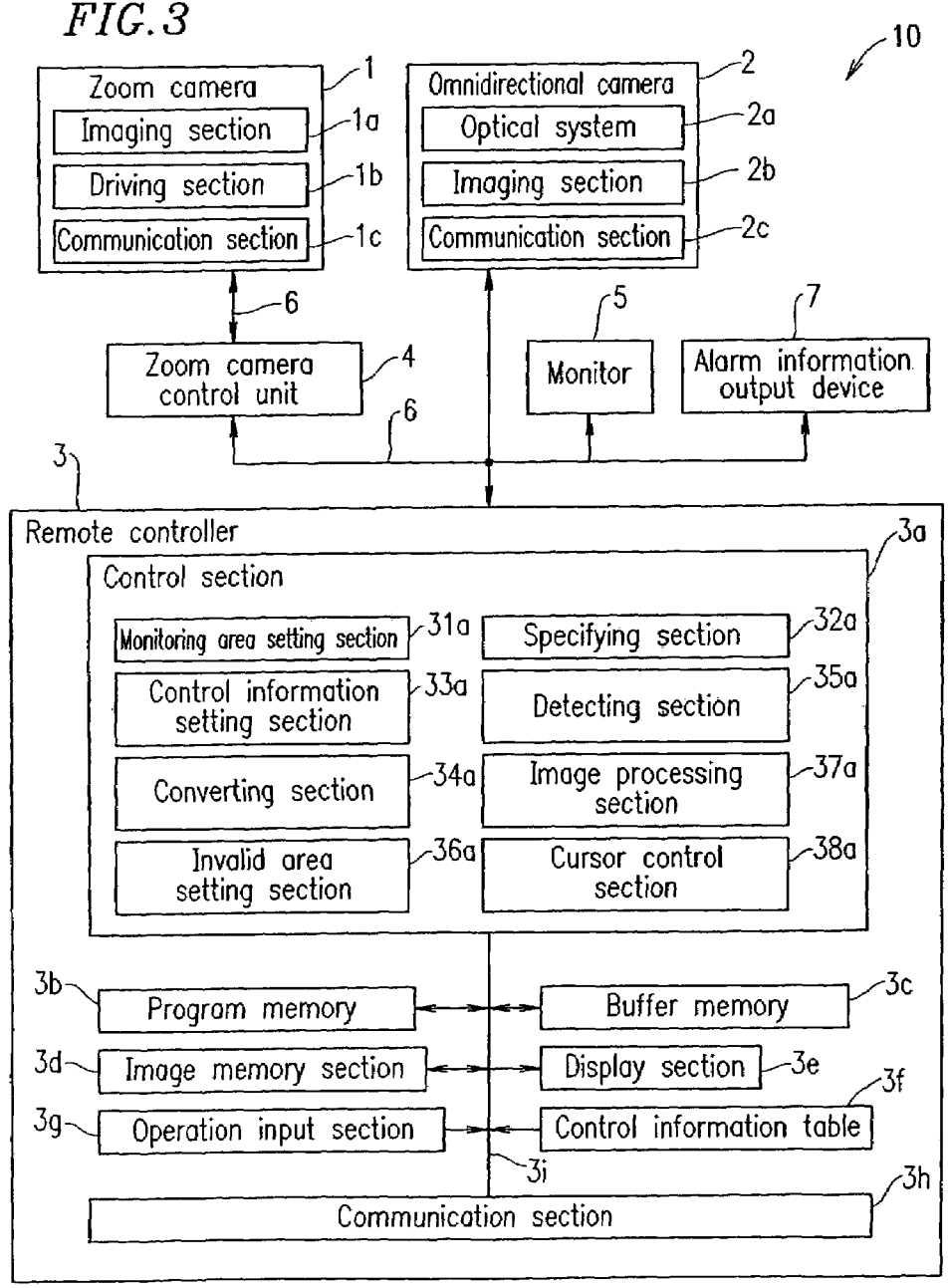
FIG. 3 is a block diagram illustrating a partial structure of the omnidirectional monitoring control system shown in FIG. 1.

FIG. 3 is a block diagram illustrating a partial structure of the omnidirectional monitoring control system 20 shown in FIG. 1. Identical elements previously discussed with respect to FIG. 1 bear identical reference numerals and the detailed descriptions thereof will be omitted.

In FIG. 3, as described above, the omnidirectional monitoring control system 20 includes the zoom camera 1, the omnidirectional camera 2, the remote controller 3, the zoom camera control unit 4 acting as a zoom camera control section, the monitor 5, and communication lines 6 (6a through 6d as shown in FIG. 1). The omnidirectional monitoring control system 20 further includes an alarm information output device 7.

The zoom camera 1 includes, for example, an imaging section (photographing section) 1a, a driving section 1b for driving and controlling the zoom lens to pan (to move to a prescribed position in a horizontal direction), to tilt (to move to a prescribed position in a vertical direction) and to zoom (to have a prescribed magnification ratio), and a communication section 1o for communicating with other devices via a wireless or wired line for transference of control signals and image signals. Based on control information sent from the zoom camera control unit 4, the zoom camera 1 is controlled to have a prescribed position (to assume a prescribed photographing direction) and to have a prescribed magnification ratio. The driving section 1b includes, for example, a pulse motor, a DC servo motor, an ultrasonic motor, or an encoder, and has a function of automatic high-speed three-dimensional control of the position and the magnification ratio.

As shown in FIG. 3, the omnidirectional camera 2 includes an optical system 2a, an imaging section (photographic section) 2b including CCDs, and a communication section 2c for communicating with other devices for transference of control signals and image signals via a wireless or wired line.

The optical system 2a includes, for example, a parabolic or hyperbolic mirror of a convex body of revolution or a fish-eye lens, and a cylindrical or cup-shaped light-transmissive body for holding a CCD camera which is included in the imaging section 2b. The optical system 2a projects an optical image over an omnidirectional viewing angle of a maximum of 360 degrees. For example, the optical system 2a projects an optical image obtained by collecting (projecting) light reflected by the mirror of the convex body of revolution by a lens or a fish-eye lens.

The imaging section 2b includes a CCD camera including, for example, an imaging lens, a CCD section, an A/D conversion circuit, and an image processing circuit. The imaging section 2b photographs the optical image projected by the optical system 2a as omnidirectional image data.

The zoom camera control unit 4 includes a computer including, for example, a CPU (central processing unit), ROM, RAM, and I/O port; and a zoom camera driving circuit. The zoom camera control unit 4 also has a function of communicating with other devices via a wireless or wired line. Based on the control information supplied from the remote controller 3, the zoom camera control unit 4 controls the position and the magnification ratio of the zoom camera 1.

The monitor 5 includes a liquid crystal display (LCD), a plasma display (PD), an electroluminescence display (ELD), or various other display devices. The monitor 5 also has a function of communicating with other devices via a wireless or wired line. The monitor 5 receives an enlarged image which is zoom-photographed by the zoom camera 1 from the remote controller 3 and displays the enlarged image on a display screen thereof.

The communication lines 6 include a plurality of communication lines for transferring data signals by, for example, an NTSC, RS-232C, or RS-485 system. The communication lines 6 may use a wireless LAN for communicating specific short-distance aerial transmission signals such as, for example, IrDAControl-system infrared signals or Bluetooth-system radio wave signals.

The alarm information output device 7 includes, for example, a buzzer, speaker, and an alarm lamp. When, for example, a subject for monitoring (hereinafter, referred to the "subject") enters a monitoring area, the alarm information output device 7 outputs alarm information including an alarming sound and an alarming light.

The remote controller 3 includes a control section 3a, a program memory 3b, a buffer memory 3a, an image memory section 3d, a display section 3e, a control information table 3f, an operation input device 3g, a communication section 3h, and a bus 3i for transferring data between these sections.

The control section 3a includes a CPU (central processing unit) of the computer. Based on a control program, the control section 3a controls the sections of the omnidirectional monitoring control system 20. The detailed structure of the control section 3a will be described later.

The program memory 3b includes, for example, a readable recording medium such as a ROM, EPROM, EEPROM, Floppy® disc, optical disc (for example, compact disc), or hard disc. The program memory 3b stores the control program for starting the control section 3a and causing the control section 3a to execute various operations.

The buffer memory 3c includes, for example, a readable recording medium such as a RAM, EPROM, EEPROM, Floppy® disc or hard disc. The buffer memory 3c temporarily stores data which is being controlled.

The image memory section 3d includes, for example, a readable recording medium such as a RAM, EPROM, EEPROM, Floppy® disc or hard disc. The image memory section 3d temporarily stores an omnidirectional image taken by the omnidirectional camera 2 frame by frame sequentially.

The display section 3e includes, for example, a liquid crystal display (LCD), a plasma display (PD), or an electroluminescence display (ELD). The display section 3e displays an omnidirectional image taken by the omnidirectional camera 2 on a display screen thereof.

The control information table 3f includes, for example, a readable recording medium such as a RAM, EPROM, EEPROM, Floppy® disc or hard disc. The control information table 3f stores control information (information on the position (photographic direction) and the magnification ratio of the zoom camera 1), which is preset by a control information setting section 33a (described below) included in the control section 3a, in correspondence with information on each of the monitoring areas (for example, the area number or the representative coordinate of each of the monitoring areas).

The operation input device 3g includes, for example, a keyboard, a specific key icon, and a mouse.

The communication section 3h includes, for example, an antenna, modem (signal modulation and demodulation device), a wireless signal conversion circuit, or a communication line connection circuit. The communication section 3h is communicable with the omnidirectional camera 2, the zoom camera control unit 4, the monitor 5, the alarm information output device 7 and the like via the communication lines 6.

The detailed structure of the control section 3a of the remote controller 3 will be described. The control section 3a includes a monitoring area setting section 31a, a specifying section 32a, the control information setting section 33a, a converting section 34a, a detecting section 35a, an invalid area setting section 36a, an image processing section 37a, and a cursor control section 38a.

Based on an operation specifying instruction from the operation input device 3g (e.g., a keyboard, a specific key icon, or a mouse) and a cursor control program and a monitoring area setting program of the control program, the monitoring area setting section 31a sequentially sets control program for controlling the zoom camera 1 to be at a prescribed position by pan driving (by moving the zoom camera 1 at a prescribed position in the horizontal direction) and by tilt driving (by moving the zoom camera 1 at a prescribed position in the vertical direction) and to have a prescribed magnification ratio by zoom driving, for photographing a plurality of monitoring areas displayed on the display screen of the display section 3e.

In addition, in the case where the omnidirectional image is circular, the monitoring area setting section 31a acts as follows. Based on an operation specification instruction from the operation input device 3g and the cursor control program and the like of the control program, the monitoring area setting section 31a sets a circular omnidirectional monitoring range (described such that the central position thereof is fine-tunable with vertical and horizontal cursor lines. The monitoring area setting section 31a divides the set omnidirectional monitoring range concentrically and radially into a plurality of monitoring areas. Area frames, or area frames and and/or area numbers, are identifiably color-displayed in correspondence with the respective monitoring areas on the display screen of the display section 3e.

Based on an operation specifying instruction from the operation input device 3g (e.g., a keyboard or a mouse) and the cursor control program and a specifying program of the control program, the specifying section 32a automatically or manually specifies a monitoring area defined by an area frame and an area number, among the plurality of monitoring areas displayed.

Based on an operation setting instruction from the operation input device 3g (e.g., a key icon or a mouse) and the cursor control program and a control information setting program of the control program, the control information setting section 33a sequentially sets the control information for performing the positional control (by pan and tilt driving) and the magnification ratio control (by zoom driving) of the zoom camera 1 for the plurality of monitoring areas displayed on the display section 3e.

The control information setting section 33a can also set control information such that the zoom camera 1 is at different pan positions (positions in the horizontal direction) for the monitoring areas arranged in different concentric regions. In this case, the zoom camera 1 is at the same tilt position (position in the vertical direction) and has the same magnification ratio for these monitoring areas arranged in different concentric regions. The control information setting section 33a can also set control information such that the zoom camera 1 has different magnification ratios for the monitoring areas arranged in different radial regions. In this case, the zoom camera 1 is at the same pan position and the same tilt position for these monitoring areas arranged in different radial regions.

The control information setting section 33a can further set a reference value of the control information for the monitoring areas arranged in one radial region, and thus automatically set a value of the control information for all the remaining monitoring areas.

When the zoom camera 1 and the omnidirectional camera 2 are separated by a prescribed distance or greater, the control information setting section 33a can correct a control value for each of the pan position, the tilt position and the magnification ratio of the control information for each monitoring area. Owing to this structure, the control information setting section 33a can match the apparent central position of the omnidirectional image with the apparent central position for driving the zoom camera 1.

Based on a conversion program of the control program, the converting section 34a converts information on the monitoring area, specified by the specifying section 32a automatically or manually, into control information for controlling the position and the magnification ratio of the zoom camera 1 for photographing the monitoring area specified by the specifying section 32a. The converting section 34a may obtain the control information for the specified monitoring area from the control information table 3f and/or from calculation using a prescribed calculation procedure.

Based on a detecting program of the control program, the detecting section 35a performs pattern matching of successive frames of the omnidirectional image which have been stored in the image memory section 3d, so as to create a difference image. The difference image is displayed on the display screen of the display section 3e as a movement of a subject (including, for example, an object which changes the image, such as a trespasser M shown in FIG. 2).

The detecting section 35a also color-displays the vertical and horizontal cursor lines crossing each other, so that the intersection of the cursor lines is located at the position representing a difference image which has a prescribed number of pixels or greater. The area number of the monitoring area where the intersection of the cursor lines is located is output to the specifying section 32a at a prescribed cycle.

When binary difference data is created using a prescribed number of pixels and a prescribed density value as threshold values, the detecting section 35a can change the threshold values in accordance with the position of the monitoring area with respect to the omnidirectional monitoring range.

Again, when binary difference data is created using a prescribed number of pixels and a prescribed density value as threshold values, the detecting section 35a can detect, from the average density value of an image of one monitoring area, a change in brightness around the one monitoring area and change the threshold values based on the change in brightness.

Based on an operation setting instruction from the operation input device 3g (e.g., a keyboard or a mouse) and the cursor control program and an invalid area setting program of the control program, the invalid area setting section 36a presets, as invalid, an arbitrary monitoring area in the omnidirectional image by dragging the mouse. The invalid area setting section 36a can also display the monitoring area which has been preset as invalid on the display section 3e. When the image preset as invalid has been specified by the specifying section 32a, the invalid area setting section 36a can invalidate the specification.

Based on an operation setting instruction from the operation input device 3g (e.g., a keyboard or a mouse) and the cursor control program and a monitoring area setting program of the control program, the image processing section 37a inverts the omnidirectional image taken by the omnidirectional camera 2 with respect to the optical image projected by the optical system 2a (the mirror of a convex body of revolution) and rotates the omnidirectional image about the central axis of the optical system 2a by a prescribed angle in a prescribed direction. The resultant image is displayed on the display screen of the display section 3e.

Based on an operation instruction from the operation input device 3g and the cursor control program of the control program, the cursor control section 38a controls the position of the intersection of the cursor on the display screen.

The omnidirectional monitoring control system 20 including the zoom camera 1 and the omnidirectional camera 2 in this example having the above-described structure, for example, the following effects.

(1) The omnidirectional camera 2 realizes monitoring over 360 degrees with no dead angle.

(2) A combination of the omnidirectional camera 2 and the usual zoom camera 1 realizes high-speed display of a high-quality zoom-up image.

(3) An automatic tracking function is provided of detecting a moving subject by the omnidirectional camera 2 and zoom-photographing the moving subject by the usual zoom camera 1.

(4) The omnidirectional camera 2 realizes wide-area detection.

(5) A manual tracking function is provided of zoom-photographing, at a high speed, a monitoring area which is manually specified from an omnidirectional image taken by the omnidirectional camera 2.

(6) An omnidirectional image taken by the omnidirectional camera 2, and an image of one of a plurality of monitoring areas in the omnidirectional image which is zoom-photographed by the zoom camera 1, can be checked at the same viewing angle.

The above-described control program is stored in prescribed readable recording memories in the remote controller 3 as follows.

The program memory 3b stores an image processing step of inverting omnidirectional image data, obtained by the omnidirectional camera 2 capable of taking an omnidirectional image over a maximum of 360 degrees, with respect to an optical image projected by the optical system 2a of the omnidirectional camera 2, a display step of displaying the image-processed omnidirectional image on a display screen; a monitoring area setting step of setting a prescribed range of the omnidirectional image as an omnidirectional monitoring range and dividing the omnidirectional monitoring range into a plurality of monitoring areas; a detecting step of detecting a movement of a subject in the omnidirectional monitoring range, a specifying step of specifying at least one monitoring area from the plurality of divided monitoring areas based on the detection result obtained by the detecting step, or manually; and a converting step of converting information on the specified monitoring area into control information for controlling the zoom camera 1 to be at a prescribed position and to have a prescribed magnification ratio for the specified monitoring area.

A memory section in the zoom camera control unit 4 stores a zoom camera control step for controlling the position and the magnification ratio of the zoom camera 1 for performing zoom-photographing centered on the specified monitoring area based on the converted control information.

At least the above-mentioned steps are executed by the computer. The control program may also include, for example, a control information setting step, a subject detecting step, an invalid area setting step, an alarm information output control step, and a zoom image display step.

Figure 4:
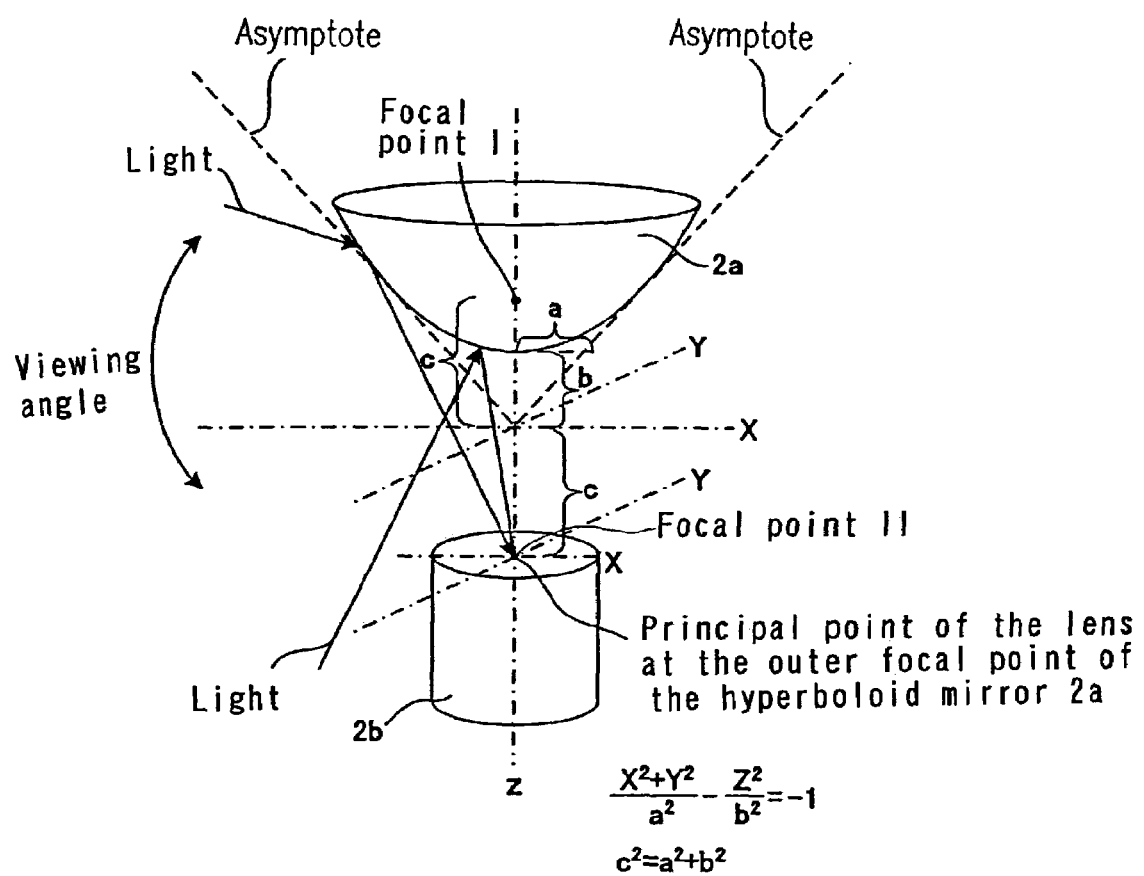
FIG. 4 is a perspective view illustrating a partial structure of an optical system of an omnidirectional camera included in the omnidirectional monitoring control system shown in FIG. 1.

FIG. 4 is a perspective view illustrating a partial structure of the optical system 2a (FIG. 3) of the omnidirectional camera 2.

In FIG. 4, the optical system 2a includes a mirror of a convex body of revolution. When a hyperbolic curve is rotated about axis Z, a hyperboloid of two sheets is obtained. The mirror of the convex body of revolution has a mirror surface on a convex surface of one of the hyperboloids (Z>0).

The one hyperboloid is represented by the following expressions.

$$\{(X^2+y^2)/a^2\}-Z^2/b^2=-1$$

$$c^2=(a^2+b^2)$$

Here, "a" and "b" are constants defining the shape of the hyperboloid. "c" is a constant defining the position of the focal point of the hyperboloid. These expressions and constants are included in conversion information for converting an omnidirectional image into a panoramic image or a perspective image. For example, these expressions and constants are pre-stored in the program memory 3b in FIG. 3.

The mirror of the convex body of revolution has two focal points, i.e., a first focal point I and a second focal point II. Light entering from the outside of the mirror and directed toward the first focal point I is reflected by the optical system 2a (i.e., by the mirror of the convex body of revolution) and is entirely directed to the second focal point II.

The rotation axis of the mirror of the convex body of revolution is matched to the optical axis of the camera lens of the imaging section 2b, and a first principal point of the camera lens is located at the focal point II. Owing to this arrangement, an image photographed by the imaging section 2b has a center of view point at the first focal point I. When the image is viewed with the first focal point I as the center of view, the position of the viewpoint is not changed in accordance with the viewing direction.

Figure 5:
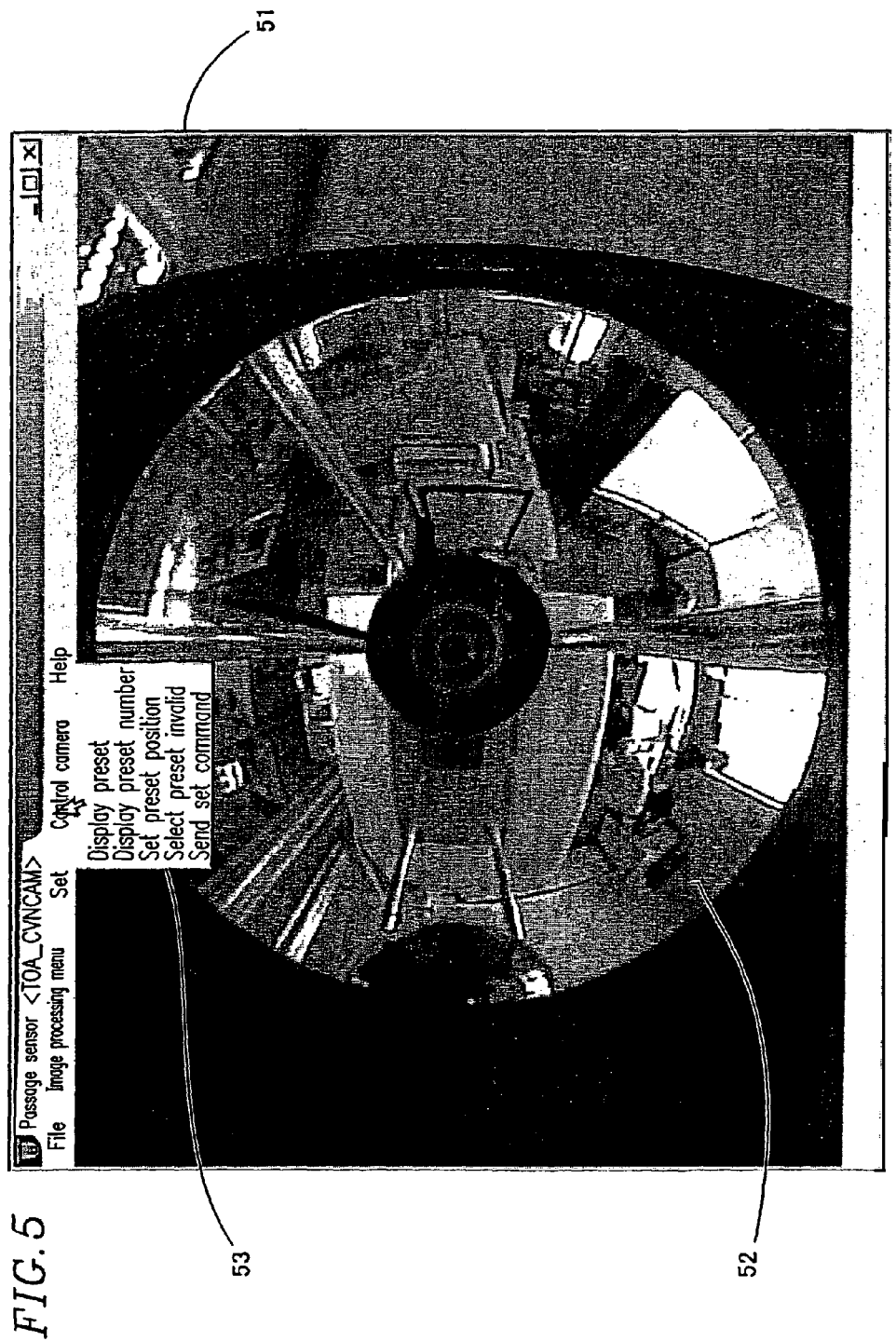
FIG. 5 shows Display Example (1) according to the example of the present invention, which is for setting control information of a monitoring area.

FIG. 5 shows Display Example (1) according to this example of the present invention. Display Example (1) is for setting control information of a monitoring area.

FIG. 5 shows a window 51 displayed on a display screen of the display section 3e. The window 51 shows a circular omnidirectional image 52, and a pull-down menu 53. The pull-down menu 53 appears when the monitoring area setting section 31a and the control information setting section 33a are started by an input operation performed using a mouse or a keyboard. The monitoring area setting section 31a and the control information setting section 33a are started for dividing the omnidirectional image 52 into a plurality of monitoring areas and for adding an area number (preset number) to each of the divided monitoring areas.

Figure 6:
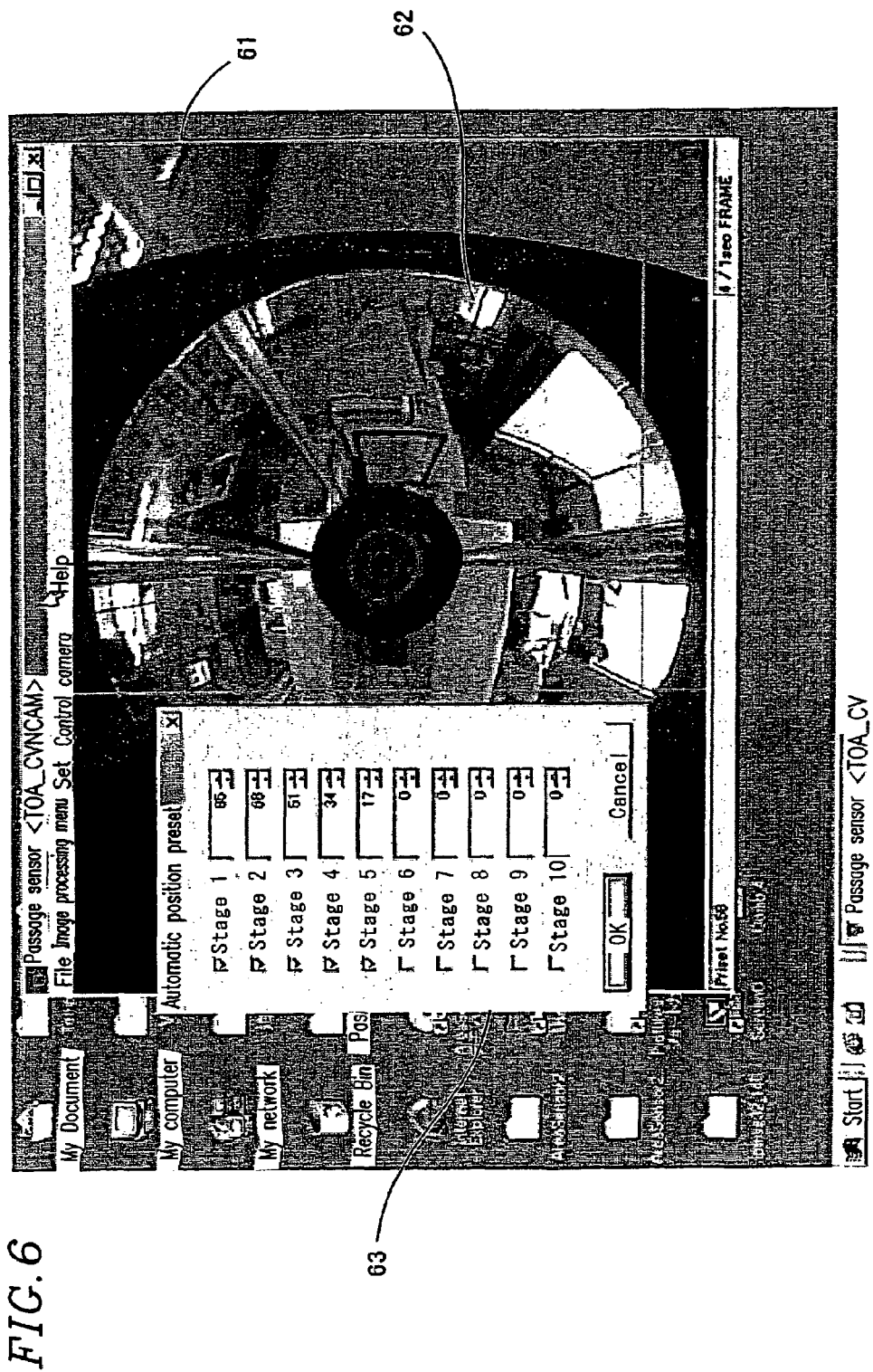
FIG. 6 shows Display Example (2) according to the example of the present invention, which is for setting control information of a monitoring area.

FIG. 6 shows Display Example (2) according to this example of the present invention. Display Example (2) is for setting control information of a monitoring area.

FIG. 6 shows a window 61 displayed on the display screen of the display section 3e. The window 61 shows a part of a circular omnidirectional image 62, and a window 63. The window 63 appears when the control information setting section 33a is started by an input operation performed using a mouse or a keyboard. The control information setting section 33a is started for dividing the omnidirectional image 62 into a plurality of monitoring areas and for adding an area number (preset number) to each of the divided monitoring areas. The window 63 allows the user to input numerical figures which represent how many monitoring areas the omnidirectional image 62 is to be equally divided into concentrically and radially.

Figure 7:
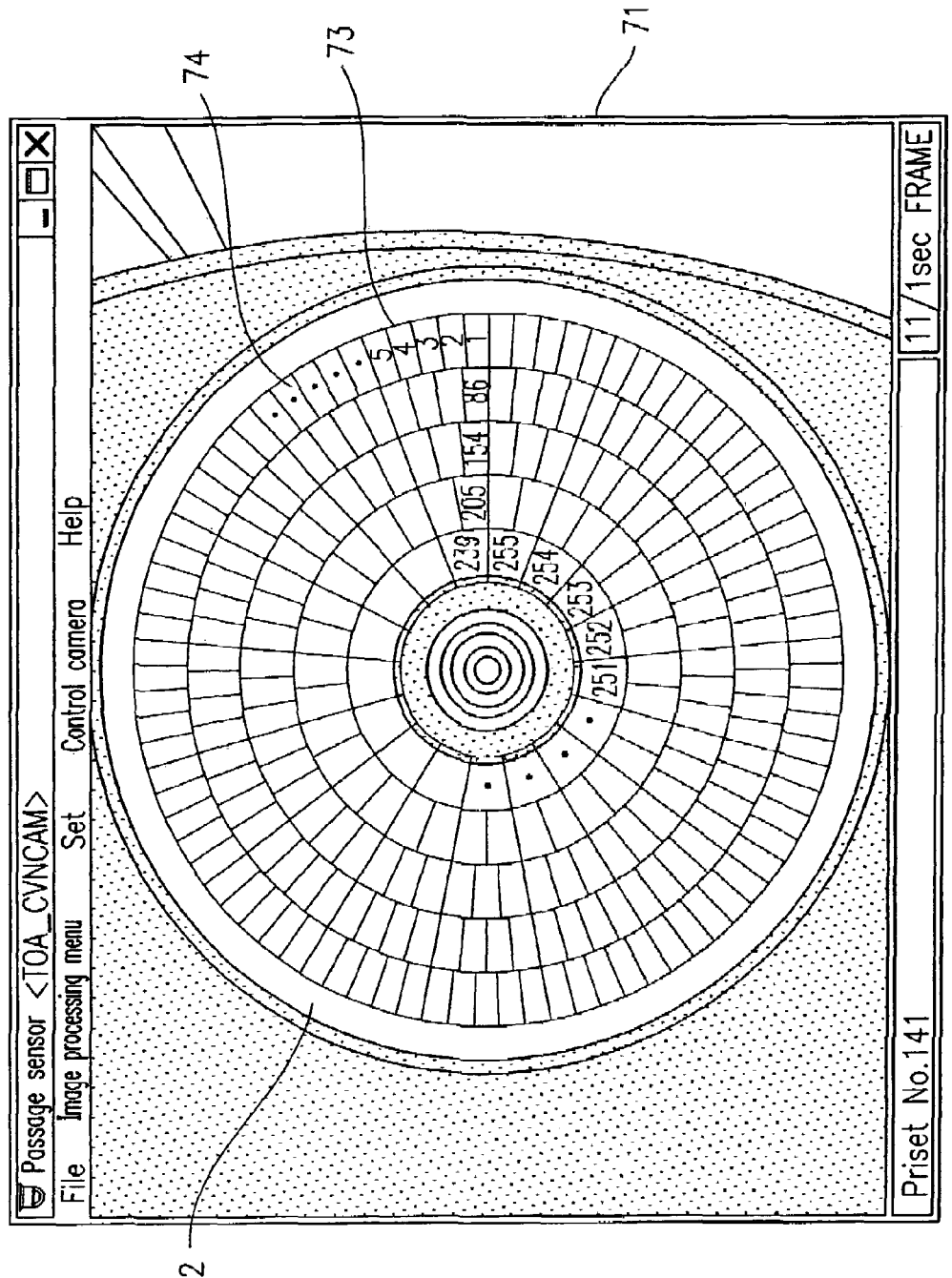
FIG. 7 shows Display Example (3) according to the example of the present invention, which is for setting control information of a monitoring area.

In this example, the omnidirectional image 62 is divided into five concentric circles. The window 63 in FIG. 6 shows the numbers of monitoring areas included in the five concentric circles. The omnidirectional image 62 after the division is shown in FIG. 7. Here, the omnidirectional image 62 is divided into 255 monitoring areas.

FIG. 7 shows Display Example (3) according to this example of the present invention. Display Example (3) is for setting control information of a monitoring area.

FIG. 7 shows a window 71 displayed on the display screen of the display section 3e. The window 71 shows a circular omnidirectional image 72, image frames 73 obtained as a result of equally dividing the omnidirectional image 72 concentrically and radially by the monitoring area setting section 31a based on the numerical figures which was input in the window 63 (FIG. 6), and area numbers 74 added to the divided monitoring areas respectively. In FIG. 7, only some of the area numbers are shown for the sake of simplicity, but actually area numbers 1 through 255 are displayed in the respective monitoring areas.

Control information for controlling the position and the magnification ratio of the zoom camera 1 is provided in correspondence with each of the divided monitoring areas numbered 1 through 255. Although not shown, a circular omnidirectional monitoring range is set such that a reference position thereof is fine-tunable by the vertical and horizontal cursor lines in advance. The circular omnidirectional monitoring range is divided into 255 monitoring areas. The zoom camera 1 can be zoomed to any monitoring area, for example, the monitoring area numbered 255. In other words, control information for zoom-driving the zoom camera 1 to 255 positions is set.

The monitoring areas numbered 1, 86, 154, 205 and 239, which are arranged in one radial region over five circumferential regions, are set as home positions (reference monitoring areas). The five circumferential regions are set to be rotatable and fine-tunable with respect to the omnidirectional image 72.

Figure 8:
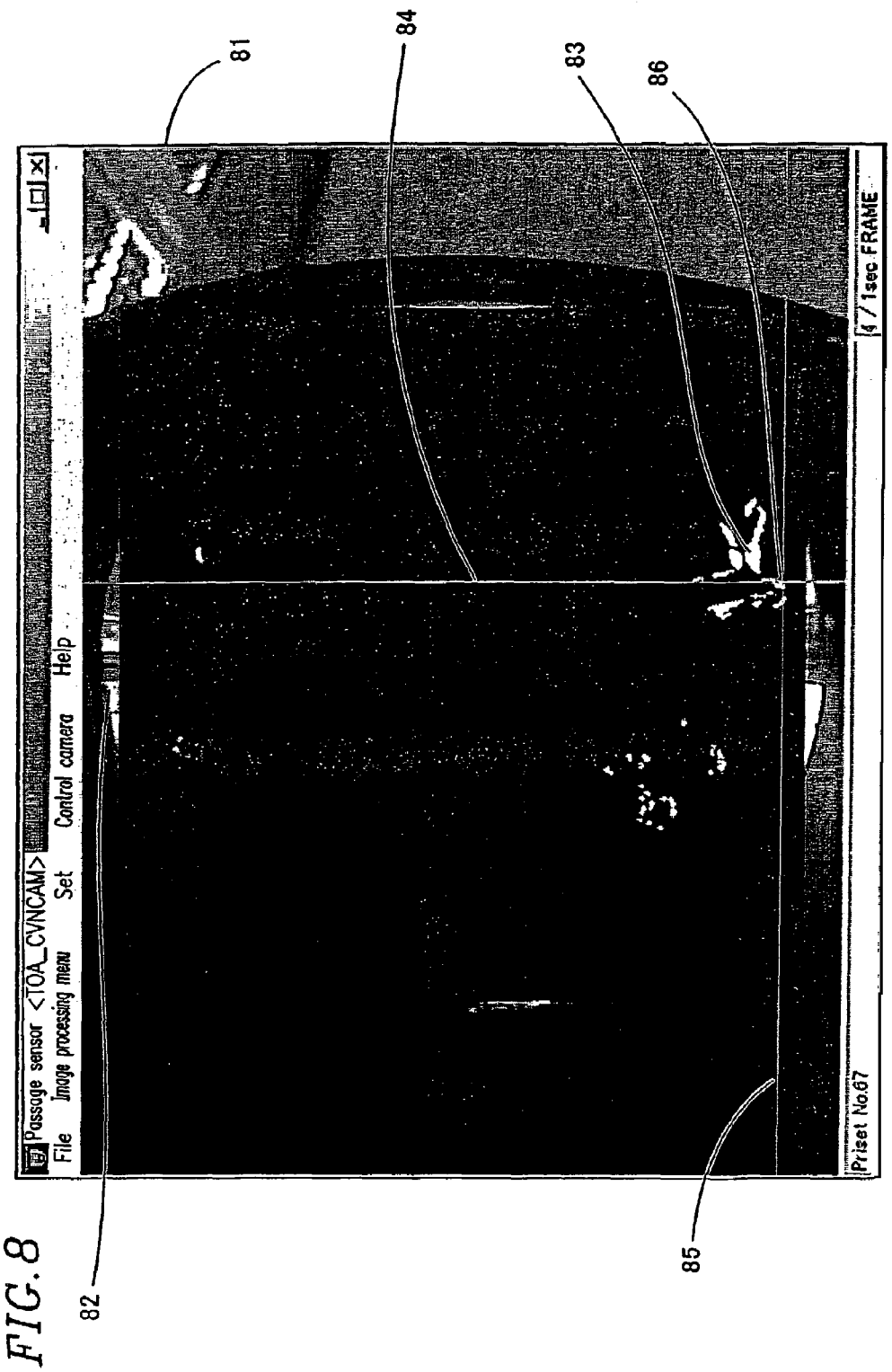
FIG. 8 shows Display Example (4) according to the example of the present invention, which is for detecting a subject.

FIG. 8 shows Display Example (4) according to this example of the present invention. Display Example (4) is for detecting a subject.

FIG. 8 shows a window 81 displayed on the display screen of the display section 3e. The window 81 shows a part of a circular omnidirectional image 82 which is mostly hidden, difference image data 83, a vertical cursor line 84, a horizontal cursor line 85, and an intersection 86 of the vertical and horizontal cursor lines 84 and 85. The difference image data 83 (white parts) is obtained by performing pattern matching of successive frames of the omnidirectional image 82 which have been stored in the image memory section 3d by the detecting section 35a. The difference image data 83 represents a part in which the image has been changed due to, for example, a movement of a subject. The vertical and horizontal cursor lines 84 and 85 track the difference data based on a certain criterion (for example, whether the area of the white parts is a prescribed level or higher), so that the intersection 86 represents the position of the subject. By automatically specifying the monitoring area including the position represented by the intersection 86, the information on this monitoring area is converted into control information for zoom-photographing this monitoring area by the zoom camera 1.

Figure 9:
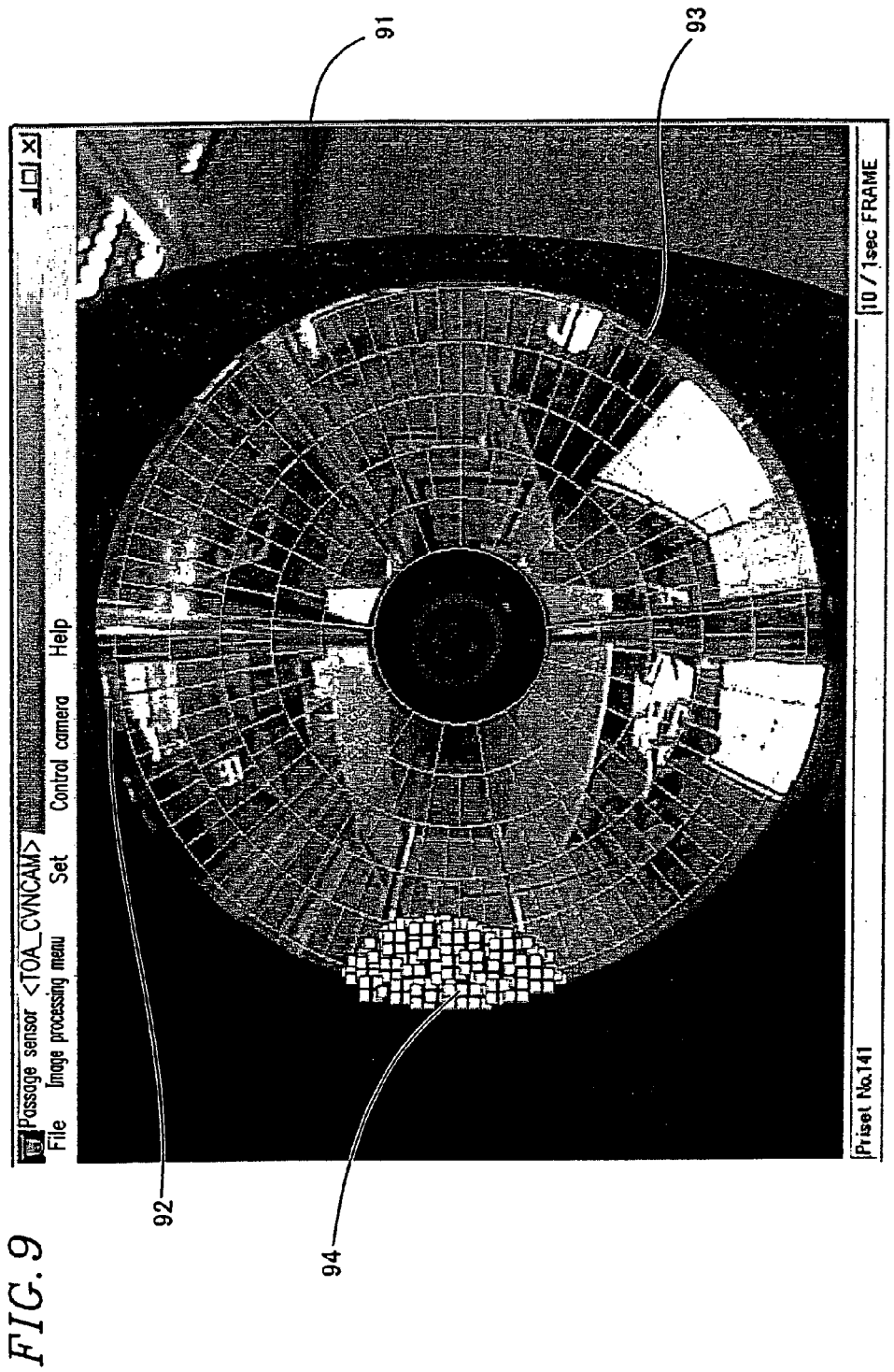
FIG. 9 shows Display Example (5) according to the example of the present invention, which is for setting an invalid area.

FIG. 9 shows Display Example (5) according to this example of the present invention. Display Example (5) is for setting an invalid area.

FIG. 9 shows a window 91 displayed on the display screen of the display section 3e. The window 91 shows a circular omnidirectional image 92, area frames 93 obtained as a result of equally dividing the omnidirectional image 92 concentrically and radially by the monitoring area setting section 31a based on the numerical figures which was input in the window 63 (FIG. 6), and a monitoring area 94 which has been preset as invalid by the invalid area setting section 36a. Here, the invalid monitoring area is set as a collection of small blocks. Alternatively, any area may be set as invalid by dragging a mouse. As described above, the invalid area setting section 36a presets, as invalid, an arbitrary monitoring area in the omnidirectional image 92 which is unstable due to environmental influence. The expression "monitoring area which is unstable due to environmental influence" means a monitoring area representing, for example, an object which moves in a normal state or an object which moves but is too small to be a trespasser or anything causing an abnormality. The monitoring area 94 preset as invalid by the invalid area setting section 36a is not subjected to the specification by the specifying section 32a or the conversion by the converting section 34a.

FIG. 10 is a flowchart illustrating a basic operation procedure for the omnidirectional monitoring control system 20 shown in FIG. 1.

As shown in FIG. 10, an omnidirectional image is photographed in step S1. More specifically, an omnidirectional image over a viewing angle of 360 degrees around the omnidirectional camera 2 is taken by the omnidirectional camera 2.

In step S2, the omnidirectional image is inverted with respect to the mirror of the optical system 2a (convex body of revolution) and also rotated about the central axis of the optical system 2a by a prescribed angle in a prescribed direction.

In step S3, the obtained omnidirectional image is displayed on the display screen of the display section 3e.

In step S4, it is determined whether or not control information for the omnidirectional image is to be set. When the control information is to be set (YES), the procedure goes to step S17. If the control information is not to be set (NO), the procedure goes to step S5.

In step S5, it is determined whether or not a monitoring area in the omnidirectional image is to be zoom-photographed by automatic specification. When a monitoring area in the omnidirectional image is to be zoom-photographed by automatic specification (YES), the procedure goes to step S6. When no monitoring area in the omnidirectional image is to be zoom-photographed by automatic specification, (NO), the procedure goes to step S16.

In step S6, it is determined whether or not there is a monitoring area which has been preset as invalid by the invalid area setting section 36a. If there is such an area (YES), the procedure goes to step S7. If there is no such area (NO), the procedure goes to step S8.

In step S7, the omnidirectional image excluding the monitoring area preset as invalid is temporarily stored in the image memory section 3d frame by frame sequentially. Then, the procedure goes to step S9.

In step S8, since there is no monitoring area preset as invalid, the entirety of the omnidirectional image is temporarily stored in the monitoring memory section 3d frame by frame sequentially. Then, the procedure goes to step S9.

In step S9, it is determined whether or not there is difference image data in the omnidirectional image, using the detecting section 35a. The difference image data is the image data which has been positionally offset between two successive frames because of a movement of a subject. If there is such data (YES), the procedure goes to step S10. If there is no such data (NO), the procedure returns to step S7. In step S7, pattern matching is performed for successive frames of the omnidirectional image which have been stored in the image memory section 3d, thereby creating a difference image. The difference image represents the positional offset of the image data caused by a movement of a subject.

In step S10, the specifying section 32a is used to cause the cursor to track the image data which is positionally offset by a prescribed level or greater (in terms of the number of pixels or the area of the image), in order to indicate mainly in which monitoring areas of the omnidirectional image that image data exists. Then, the area numbers of the monitoring areas corresponding to the image data are sequentially specified.

In step S11, the converting section 34a is used to convert the information on the monitoring area specified by the specifying section 32a (for example, the area number of the monitoring area) into the preset control information. The conversion is performed by referring to the control information table 3f and/or from calculation using a prescribed calculation procedure.

In step S12, the communication section 3h is used to send the converted control information obtained by the converting section 34a to the zoom camera control unit 4 via one of the communication lines 6.

In step S13, the zoom camera unit 4 controls the position and the magnification ratio of the zoom camera 1 based on the received control information via one of the communication lines 6.

In step S14, a target monitoring area is zoom-photographed by the zoom camera 1.

In step S15, the zoom-photographed image is displayed on the display screen of the monitor 5. Thus, the procedure is completed.

In step S16, when the omnidirectional image is not zoom-photographed (NO in step S5), the specifying section 32a is used to, based on an operation specification instruction received through the mouse, specify the area number of the monitoring area to be zoom-photographed by the zoom camera 1. Then, the procedure jumps to step S11.

In the case where it is determined in step S4 that control information for the omnidirectional image is to be set, the following procedure is performed.

In step S17, the monitoring area setting section 31a is used to set the central position of the circular omnidirectional monitoring range on the omnidirectional image displayed on the display section 3e, and to display the central position on the display section 3e.

In step S18, the omnidirectional monitoring range is divided concentrically and radially into a plurality of monitoring areas, and area frames and area numbers defining the respective monitoring areas are displayed together with the omnidirectional image.

In step S19, it is determined whether or not the control information for each monitoring area is to be set automatically. When the control information is to be set automatically (YES), the procedure goes to step S20. When the control information is not to be set automatically (NO), the procedure goes to step S22.

In step S20, the control information setting section 33a is used to set reference values (for the pan position, the tilt position, and the magnification ratio) of the control information for each monitoring area arranged in one radial region of the omnidirectional image.

In step S21, values of the control information for all the remaining monitoring areas arranged in the concentric regions of the omnidirectional image are set. Then, the procedure goes to step S23.

For the monitoring areas arranged in different concentric regions, the zoom camera 1 is set to be different only in the pan position, with the tilt position and the magnification ratio being the same. For the monitoring areas arranged in different radial regions, the zoom camera 1 is set to be different only in magnification ratio, with the pan position and the tilt position being the same.

In step S22, the control information setting section 33a is used to manually set the control information (pan position, tilt position, and magnification ratio) for each monitoring area provided with the area number.

In step S23, the set control information is stored in the control information table 3f. The procedure returns to step S5.

As described above, the omnidirectional monitoring control system 20 according to this example of the present invention operates as follows. A wide-range omnidirectional image taken by the omnidirectional camera 2 is set as a plurality of monitoring areas. Among the plurality of monitoring areas, one monitoring area is automatically or manually specified. Thus, the omnidirectional image can be zoomed-photographed centered on the monitoring area with high precision. In addition, the omnidirectional image is inverted with respect to the optical image projected by the optical system 2a and rotated about the central axis of the optical system 2a by a prescribed angle in a prescribed direction. The zoom camera 1 is driven about a prescribed monitoring position of the resultant omnidirectional image data. Thus, the apparent central position of the omnidirectional camera 2 can be matched with the apparent central position for driving the zoom camera 1. In this manner, the omnidirectional image taken by the omnidirectional camera 2 and the image zoom-photographed by the zoom camera 1 can be checked at the same viewing angle.

In the above example, the composite camera system 10 includes one zoom camera 1. The present invention is not limited to such a structure. The control section 3a of the remote controller 3 may control the position and the magnification ratio of a plurality of zoom cameras via the zoom camera control unit 4. In this case, a plurality of display screens of the display section 3e may be provided in correspondence with the plurality of zoom cameras, or one display screen may display images corresponding to the plurality of zoom cameras sequentially.

In the above example, the position of the zoom camera is controlled by pan driving and tilt driving, and the magnification of the zoom camera is controlled by zoom driving. The pan driving, the tilt driving, and the zoom driving are merely examples for controlling the position and magnification ratio, and the present invention is not limited to this.

As described above, according to the present invention, a plurality of monitoring areas are set in a wide-range omnidirectional image taken by an omnidirectional camera, and one of the monitoring areas is automatically or manually specified. Thus, the omnidirectional image can be zoom-photographed, centered on the monitoring area with high precision. The omnidirectional image taken by the omnidirectional camera is inverted with respect to an optical image projected by the optical system and rotated about the central axis of the optical system at a prescribed angle in a prescribed direction. The zoom camera is driven about a prescribed monitoring position of the resultant omnidirectional image data. Thus, the apparent central position of the omnidirectional camera can be matched with the apparent central position for driving the zoom camera. In this manner, the omnidirectional image taken by the omnidirectional camera and the image zoom-photographed by the zoom camera can be checked at the same viewing angle. Therefore, the site of the abnormality can be tracked. Even when there are a plurality of important sites, the important site where abnormality has actually occurred can be visually checked.

An omnidirectional horizontal optical image over a viewing angle of a maximum of 360 degrees is projected to an imaging section through a mirror of a convex body of revolution or a fish-eye lens. Since a wide monitoring range is photographed by one omnidirectional camera, it is not necessary to install a plurality of monitoring cameras.

An omnidirectional image taken by an omnidirectional camera is inverted with respect to the mirror of a convex body of revolution and rotated about the central axis of the mirror of a convex body of revolution at a prescribed angle in a prescribed direction. The obtained image is displayed on a display screen of the display section. Thus, the omnidirectional image taken by the omnidirectional camera can be checked with the same viewing angle as that of the image taken by the zoom camera. Also, the relative positions of the optical image projected on the mirror of a convex body of revolution and the omnidirectional image taken by the imaging section of the zoom camera can be adjusted.

A circular omnidirectional monitoring range is set with respect to a circular omnidirectional image with high precision, and the omnidirectional monitoring range is divided into a plurality of monitoring areas. The area frames and the area numbers respectively provided for the plurality of monitoring areas can be identifiably color-displayed in association with the plurality of monitoring areas.

The control information for the zoom camera is set for each of the monitoring areas displayed on the display screen of the display section by a simple key or mouse operation. The control information can be correctly corresponded to the specified monitoring area.

The control information is set such that the zoom camera is at different pan positions for the monitoring areas arranged in different concentric regions with the same tilt position and the same magnification ratio, and such that the zoom camera has different magnification ratios for the monitoring areas arranged in different radial regions with the same pan position and the same tilt position. In this case, the operation of setting the control information for each monitoring area is simplified, and the optimum zoom photographing of each monitoring area can be performed.

A reference value of the control information is set for the monitoring areas arranged in one radial region, and thus a value of the control information is automatically set for all the remaining monitoring areas. In this case, the control information for the zoom camera for photographing each monitoring area can be easily set.

When the zoom camera and the omnidirectional camera are separated by a prescribed distance or greater, the control information setting section corrects a value for each of the pan position, the tilt position and the magnification ratio of the control information for each monitoring area, such that an apparent reference position of the omnidirectional camera is matched with an apparent reference position for driving the zoom camera. In this case, even when the zoom camera is distant from the omnidirectional camera, the zoom camera can zoom-photograph the monitoring area at the same viewing angle as that of the omnidirectional camera.

The omnidirectional image taken by the omnidirectional camera is stored frame by frame sequentially, and a difference image is created by performing pattern matching of successive frames of the omnidirectional image stored in the image memory section and identifiably displayed as the movement of the subject on a display screen of the display section. In this case, the movement of the subject included in the omnidirectional image taken by the omnidirectional camera can be easily detected from the difference image displayed on the display section.

A vertical cursor line and a horizontal cursor line which cross each other at a position representing a difference image having a prescribed number of pixels are displayed, and the area number of the monitoring area having an intersection of the vertical cursor line and the horizontal cursor line is output to the specifying section at a prescribed cycle. In this case, the position of the difference image representing the movement of the subject can be easily confirmed, and the area number of the monitoring area including the difference image can be automatically specified at a prescribed cycle.

When a binary difference image is created using a prescribed number of pixels and a prescribed density value as threshold values, the threshold values are changed in accordance with the position of the monitoring area with respect to the omnidirectional monitoring range. In this case, the precision of creating the difference image can be prevented from lowering depending on the position of the monitoring area, and the precision of detecting the movement of the subject can be improved.

When a binary difference image is created using a prescribed number of pixels and a prescribed density value as threshold values, a change in brightness around the one monitoring area can be detected from an average density value of an image of one monitoring area, the threshold values can be changed based on the change in brightness. In this case, the precision of creating the difference image can be prevented from lowering due to the change in the brightness around the monitoring area, and the precision of detecting the movement of the subject can be improved.

An arbitrary area of the omnidirectional monitoring range can be preset as invalid by an input operation performed through an operation input section, and the monitoring area which has been preset as invalid is displayed on the display screen of the display section. In this case, the monitoring area which is unstable due to environmental influence is preset as invalid. Thus, the precision of detecting the movement of the subject is prevented from lowering, and malfunction of the zoom camera is avoided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An omnidirectional monitoring control system, comprising:
    an omnidirectional camera for taking an omnidirectional image over a viewing angle of a maximum of 360 degrees;
    at least one zoom camera for performing positional control and magnification ratio control;
    a control section for rotating the omnidirectional image about a central axis of the omnidirectional image at a prescribed angle such that an apparent reference position of the omnidirectional camera is matched with an apparent reference position for driving the at least one zoom camera, and driving the at least one zoom camera to allow a prescribed monitoring position of omnidirectional image data obtained by the rotation to be photographed by the at least one zoom camera; and
    a display section for displaying the omnidirectional image taken by the omnidirectional camera and a zoom image taken by the at least one zoom camera.

2. An omnidirectional monitoring control system according to claim 1, wherein the positional control is performed for controlling a photographic position by pan driving and tilt driving, and the magnification ratio control is performed by zoom driving.

3. An omnidirectional monitoring control system according to claim 1, wherein the prescribed monitoring position of the omnidirectional image data is a position where a moving subject has been detected or a manually specified position.

4. An omnidirectional monitoring control system according to claim 1, wherein the control section includes:
    an image processing section for processing the omnidirectional image;
    a monitoring area setting section for setting a prescribed monitoring range of the omnidirectional image as an omnidirectional monitoring range, and dividing the omnidirectional monitoring range into a plurality of monitoring areas;
    a detecting area for detecting a movement of a subject in the omnidirectional monitoring range;
    a specifying area for specifying one of the plurality of monitoring areas based on a detection result obtained by the detecting section or manually;
    a converting section for converting information on the monitoring area specified by the specifying section into control information for controlling the zoom camera to be at a prescribed position and to have a prescribed magnification ratio for photographing the monitoring area specified by the specifying section; and
    a zoom camera control section for controlling the zoom camera to be at the prescribed position and to have the prescribed magnification ratio for zoom-photographing the monitoring area specified by the specifying section, based on the control information converted by the converting section.

5. An omnidirectional monitoring control system according to claim 1, wherein the omnidirectional camera includes an optical system for projecting the omnidirectional image using a minor of a parabolic or hyperbolic convex body of revolution, or a fish-eye lens.

6. An omnidirectional monitoring control system according to claim 4, wherein the omnidirectional camera includes an optical system for projecting the omnidirectional image using a mirror of a parabolic or hyperbolic convex body of revolution, or a fish-eye lens.

7. An omnidirectional monitoring control system according to claim 6, wherein the image processing section inverts the omnidirectional image taken by the omnidirectional camera with respect to the optical image obtained by the mirror of convex body of revolution and rotating the omnidirectional image about a central axis of the mirror of convex body of revolution by a prescribed angle in a prescribed direction, and displays the obtained image on a display screen of the display section.

8. An omnidirectional monitoring control system according to claim 4, wherein when the omnidirectional image is circular, the monitoring area setting section sets a circular omnidirectional monitoring range such that a reference position thereof is fine-tunable by a cursor, divides the omnidirectional monitoring range concentrically and radially into the plurality of monitoring areas, and identifiably displays the plurality of monitoring areas together with area frames or area numbers respectively defining the plurality of image areas.

9. An omnidirectional monitoring control system according to claim 4, further comprising:
  a control information setting section for sequentially setting the control information for controlling the zoom camera to beat the prescribed position by pan driving and tilt driving and to have the prescribed magnification ratio by zoom driving for each of the plurality of monitoring areas displayed on the display screen of the display section using a specific operation input section; and
  a control information table for storing the sequentially set control information in correspondence with each of the plurality of monitoring areas,
  wherein the converting section obtains the control information for the monitoring area specified by the specifying section from the control information table and/or from calculation using a prescribed calculation procedure.

10. An omnidirectional monitoring control system according to claim 9, wherein the control information setting section sets the control information such that the zoom camera is at different pan positions for the monitoring areas arranged in different concentric regions with the same tilt position and the same magnification ratio, and such that the zoom camera has different magnification ratios for the monitoring areas arranged in different radial regions with the same pan position and the same tilt position.

11. An omnidirectional monitoring control system according to claim 9, wherein the control information setting section sets a reference value of the control information for the monitoring areas arranged in one radial region, and thus automatically sets a value of the control information for all the remaining monitoring areas.

12. An omnidirectional monitoring control system according to claim 9, wherein when the zoom camera and the omnidirectional camera are separated by a prescribed distance or greater, the control information setting section corrects a value for each of the pan position, the tilt position and the magnification ratio of the control information for each monitoring area, such that an apparent reference position of the omnidirectional camera is matched with an apparent reference position for driving the zoom camera.

13. An omnidirectional monitoring control system according to claim 4, further comprising an image memory section for temporarily storing the omnidirectional image taken by the omnidirectional camera frame by frame sequentially, wherein the detecting section creates a difference image by performing pattern matching of successive frames of the omnidirectional image stored in the image memory section, and identifiably displays the difference image as the movement of the subject on a display screen of the display section.

14. An omnidirectional monitoring control system according to claim 13, wherein the detecting section displays, on the omnidirectional image, a vertical cursor and a horizontal cursor which cross each other at a position representing a difference image having a prescribed number of pixels, and outputs the area number of the monitoring area having an intersection of the vertical cursor and the horizontal cursor to the specifying section at a prescribed cycle.

15. An omnidirectional monitoring control system according to claim 13, wherein when a binary difference image is created using a prescribed number of pixels and a prescribed density value as threshold values, the detecting section changes the threshold values in accordance with the position of the monitoring area with respect to the omnidirectional monitoring range.

16. An omnidirectional monitoring control system according to claim 13, wherein when a binary difference image is created using a prescribed number of pixels and a prescribed density value as threshold values, the detecting section detects, from an average density value of an image of one monitoring area, a change in brightness around the one monitoring area and change the threshold values based on the change in brightness.

17. An omnidirectional monitoring control system according to claim 4, further comprising an invalid area setting section for presetting, as invalid, an arbitrary area of the omnidirectional monitoring range by an input operation performed through an operation input section, and identifiably displays the monitoring area which has been preset as invalid on the display screen of the display section.

18. An omnidirectional monitoring control method, comprising the steps of:
  processing an omnidirectional image taken by an omnidirectional camera capable of taking an omnidirectional image over a viewing angle of a maximum of 360 degrees;
  displaying the processed omnidirectional image;
  setting a prescribed range of the omnidirectional image as an omnidirectional monitoring range, and when the omnidirectional monitoring range is circular, dividing the omnidirectional monitoring range concentrically and radially into a plurality of monitoring areas based on input data representing the number of monitoring areas;
  detecting a movement of a subject in the omnidirectional monitoring range;
  specifying one of the monitoring areas based on a detection result obtained by the detecting section or manually;
  converting information on the monitoring area specified by the specifying section into control information for controlling the zoom camera to be at a prescribed position and to have a prescribed magnification ratio for zoom-photographing the monitoring area specified by the specifying section; and
  controlling the zoom camera to be at the prescribed position and to have the prescribed magnification ratio for zoom-photographing the monitoring area specified by the specifying section, based on the control information converted by the converting section.

19. A zoom camera control program embodied in a computer-readable medium for executing an omnidirectional monitoring control method comprising the steps of:

processing an omnidirectional image taken by an omnidirectional camera capable of taking an omnidirectional image over a viewing angle of a maximum of 360 degrees;

displaying the processed omnidirectional image;

setting a prescribed range of the omnidirectional image as an omnidirectional monitoring range, and when the omnidirectional monitoring range is circular, dividing the omnidirectional monitoring range concentrically and radially into a plurality of monitoring areas based on input data representing the number of monitoring areas;

detecting a movement of a subject in the omnidirectional monitoring range;

specifying one of the monitoring areas based on a detection result obtained by the detecting section or manually;

converting information on the monitoring area specified by the specifying section into control information for controlling the zoom camera to be at a prescribed position and to have a prescribed magnification ratio for zoom-photographing the monitoring area specified by the specifying section; and controlling the zoom camera to be at the prescribed position and to have the prescribed magnification ratio for zoom-photographing the monitoring area specified by the specifying section, based on the control information converted by the converting section.

* * * * *

UNITED STATES PATENT AND TRADEMARK OFFICE
CERTIFICATE OF CORRECTION

PATENT NO. : 7,479,979 B2  
APPLICATION NO. : 10/376927  
DATED : January 20, 2009  
INVENTOR(S) : Kakou et al.

It is certified that error appears in the above-identified patent and that said Letters Patent is hereby corrected as shown below:

Title page should read

(73) Assignee:  Sharp Kabushiki Kaisha, Osaka (JP)
                TOA Kabushiki Kaisha, Hyogo (JP)

Signed and Sealed this

Twenty-eighth Day of July, 2009

JOHN DOLL  
*Acting Director of the United States Patent and Trademark Office*